(12) United States Patent
Seol

(10) Patent No.: US 10,076,961 B2
(45) Date of Patent: Sep. 18, 2018

(54) METHOD FOR CONTROLLING REGENERATIVE BRAKE SYSTEM FOR VEHICLE

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 46 days.

(21) Appl. No.: 14/933,433

(22) Filed: Nov. 5, 2015

(65) Prior Publication Data

US 2016/0121729 A1   May 5, 2016

(30) Foreign Application Priority Data

Nov. 5, 2014 (KR) .................. 10-2014-0152815

(51) Int. Cl.
*B60T 1/10* (2006.01)
*B60L 7/26* (2006.01)
(Continued)

(52) U.S. Cl.
CPC .............. *B60L 7/26* (2013.01); *B60L 15/2009* (2013.01); *B60T 1/10* (2013.01); *B60T 8/176* (2013.01); *B60T 8/17616* (2013.01); *B60L 2240/423* (2013.01); *B60T 2270/602* (2013.01); *B60T 2270/603* (2013.01); *B60T 2270/604* (2013.01); *B60T 2270/613* (2013.01);
(Continued)

(58) Field of Classification Search
None
See application file for complete search history.

(56) References Cited

U.S. PATENT DOCUMENTS 5,257,192 A * 10/1993 Masaki ............... B60T 8/17636
180/197
5,908,370 A * 6/1999 Kubo ..................... F16H 61/061
477/143
(Continued)

FOREIGN PATENT DOCUMENTS

JP   07-257346 A   10/1995
JP   2003-137084 A   5/2003
(Continued)

OTHER PUBLICATIONS

Office Action dated Dec. 6, 2016 of corresponding Japanese Patent Application No. 2015-205813—5 pages.

*Primary Examiner* — Truc M Do
(74) *Attorney, Agent, or Firm* — Knobbe Martens Olson & Bear LLP

(57) ABSTRACT

A method for controlling a regenerative brake system for a vehicle may include: generating a target pressure of each wheel of the vehicle, when any one performance condition of ABS-associated control, VDC-associated control, and TCS-associated control is satisfied; determining whether to enter the ABS-associated control; opening an entrance-side wheel of a target wheel such that a raised/lowered pressure for the target wheel is formed, when determining to perform the VDC-associated control or TCS-associated control; and performing pressure raising/lowering control for the target wheel by controlling a motor such that a wheel pressure of the target wheel follows the target pressure of the target wheel.

5 Claims, 4 Drawing Sheets

(51) Int. Cl.
  *B60T 8/176* (2006.01)
  *B60T 8/1761* (2006.01)
  *B60L 15/20* (2006.01)

(52) U.S. Cl.
  CPC .............. *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 5,967,628 | A * | 10/1999 | Abe | B60T 7/12 188/353 |
| 6,120,112 | A * | 9/2000 | Toda | B60T 8/4045 303/113.4 |
| 6,238,019 | B1 * | 5/2001 | Okazaki | B60T 8/3275 303/113.2 |
| 6,374,162 | B1 * | 4/2002 | Tanaka | B60T 8/1755 180/197 |
| 2003/0020327 | A1 * | 1/2003 | Isono | B60T 8/4081 303/113.4 |
| 2003/0028308 | A1 * | 2/2003 | Ishikawa | B60T 8/1764 701/71 |
| 2004/0041470 | A1 * | 3/2004 | Imamura | B60T 8/172 303/167 |
| 2004/0212245 | A1 * | 10/2004 | Tsunehara | B60L 7/26 303/3 |
| 2005/0218717 | A1 * | 10/2005 | Nishina | B60K 6/44 303/152 |
| 2007/0024115 | A1 * | 2/2007 | Nomura | B60T 8/365 303/187 |
| 2007/0126382 | A1 * | 6/2007 | Kang | B60L 7/24 318/376 |
| 2007/0152500 | A1 * | 7/2007 | Wakabayashi | B60T 7/22 303/155 |
| 2007/0159001 | A1 * | 7/2007 | Miyazaki | B60T 8/4081 303/113.4 |
| 2007/0188014 | A1 * | 8/2007 | Sato | B60T 8/4081 303/11 |
| 2007/0188017 | A1 * | 8/2007 | Niino | B60T 8/405 303/113.2 |
| 2007/0194622 | A1 * | 8/2007 | Nakazawa | B60T 8/4081 303/155 |
| 2008/0207391 | A1 * | 8/2008 | Ikematsu | B60T 8/1763 477/28 |
| 2009/0096279 | A1 * | 4/2009 | Hosaka | B60T 7/12 303/11 |
| 2009/0281698 | A1 * | 11/2009 | Wilson | F16H 61/0251 701/55 |
| 2010/0270855 | A1 * | 10/2010 | Sawada | B60T 8/1764 303/113.2 |
| 2011/0025121 | A1 * | 2/2011 | Yang | B60T 7/042 303/15 |
| 2012/0068529 | A1 * | 3/2012 | Nakaoka | B60T 8/321 303/114.1 |
| 2012/0139330 | A1 * | 6/2012 | Morishita | B60T 1/10 303/3 |
| 2013/0134768 | A1 * | 5/2013 | Ito | B60L 3/0092 303/3 |
| 2013/0154344 | A1 * | 6/2013 | Imamura | B60T 8/1755 303/3 |
| 2013/0184953 | A1 * | 7/2013 | Morishita | B60T 7/042 701/70 |
| 2013/0234500 | A1 * | 9/2013 | Morishita | B60T 1/10 303/3 |
| 2014/0197680 | A1 | 7/2014 | Gilles | |
| 2015/0123457 | A1 * | 5/2015 | Naito | B60T 1/10 303/3 |
| 2015/0353079 | A1 * | 12/2015 | Suzuki | B60T 8/1755 701/43 |

FOREIGN PATENT DOCUMENTS

| | | |
|---|---|---|
| JP | 2005-035367 A | 2/2005 |
| JP | 2006-176046 A | 7/2006 |
| JP | 2007-038764 A | 2/2007 |
| JP | 2012-131293 A | 7/2012 |
| JP | 2015-013523 A | 1/2015 |
| KR | 10-2006-0121388 A | 11/2006 |
| WO | 2010/143660 A1 | 12/2010 |

* cited by examiner

METHOD FOR CONTROLLING REGENERATIVE BRAKE SYSTEM FOR VEHICLE

CROSS-REFERENCES TO RELATED APPLICATIONS

The present application claims priority to Korean application number 10-2014-0152815, filed on Nov. 5, 2014, which is incorporated by reference in its entirety.

BACKGROUND

The present disclosure relates to a method for controlling a regenerative brake system for a vehicle. The related technology of the present invention is disclosed in Korean Patent Laid-open Publication No. 10-2006-0121388 published on Nov. 29, 2006.

SUMMARY

Embodiments of the present invention are directed to a method for controlling a regenerative brake system for a vehicle, which can precisely control a wheel pressure at a low-pressure period by directly controlling a wheel pressure based on a split pressure sensed through a pressure sensor during VDC (Vehicle Dynamics Control)/TCS (Traction Control System)-associated control, and reduce a delay time required for switching to CBS(Conventional Brake System) pressure control after the VDC/TCS-associated control.

ESC (Electronic Stability Control)-integrated brake system includes an ESC apparatus and is capable of performing active braking in a CBS(Conventional Brake System). When the stability of a vehicle is reduced while the vehicle goes straight, turns, or climbs a slope, a ESC-integrated regenerative brake system operates an ABS (Auto Braking System), VDC, or TCS function to secure the stability of the vehicle.

For ESC-integrated regenerative brake systems, however, a difference may occur between the pressure of a wheel and the pressure of a split at which a pressure sensor is positioned, during ABS/VDC/TCS-associated control. Thus, some ESC-integrated regenerative brake systems may not utilize the pressure sensor, but estimate a wheel pressure using open times of an entrance-side valve and an exit-side valve. Therefore, a difference may exist between the estimated wheel pressure and an actual wheel pressure. In order to compensate for the difference, various methods may be applied. However, a difference between the estimated wheel pressure and the actual wheel pressure inevitably continues to appear. Due to the characteristic of valve control, ESC-integrated regenerative brake systems may not perform low-pressure control at 5 bar or less.

ESC-integrated regenerative brake systems may perform CBS switching control in order to perform CBS pressure control after ABS/VDC/TCS-associated control. Thus, ESC-integrated system inevitably may require some time for switching control.

In one embodiment, a method for controlling a regenerative brake system for a vehicle may include: generating a target pressure of each wheel, when any one performance condition of ABS-associated control, VDC-associated control, and TCS-associated control is satisfied; determining whether to enter the ABS-associated control; opening an entrance-side wheel of a wheel to be controlled (target wheel) such that a raised/lowered pressure for the wheel to be controlled is formed, when determining to perform the VDC-associated control or TCS-associated control; and performing pressure raising/lowering control for the wheel to be controlled by controlling a motor such that a wheel pressure of the wheel to be controlled follows the target pressure of the wheel to be controlled.

The performing of the pressure raising/lowering control for the wheel to be controlled may include: sensing the wheel pressure of the wheel to be controlled through a split; and calculating a pressure gain corresponding to a pressure difference between the target pressure of the wheel to be controlled and the wheel pressure of the wheel to be controlled, and controlling the motor according to the pressure gain such that the wheel pressure of the wheel to be controlled follows the target pressure of the wheel to be controlled.

The pressure gain may be set on the basis of the amount of liquid required in the wheel to be controlled with respect to the total amount of liquid required during CBS pressure control.

In the opening of the entrance-side valve of the wheel to be controlled, the entrance-side valves of the other wheels excluding the wheel to be controlled may be closed.

The method may further include opening the entrance-side valves of all the wheels and closing the exit-side valves of all the wheels, when the performance condition of the VDC-associated control or the TCS-associated control is released.

In another embodiment, a method for controlling a regenerative brake system for a vehicle may include: generating a target pressure of each wheel; opening an entrance-side valve of a wheel to be controlled, when a behavior of the vehicle satisfies a performance condition of VDC-associated control or TCS-associated control; and performing pressure raising/lowering control for the wheel to be controlled by controlling a motor such that the target pressure is formed at the wheel to be controlled.

The performing of the pressure raising/lowering control for the wheel to be controlled may include: sensing a wheel pressure of the wheel to be controlled through a split; and controlling the motor such that the wheel pressure of the wheel to be controlled follows the target pressure of the wheel to be controlled.

The controlling of the motor may include calculating a pressure gain corresponding to a pressure difference between the target pressure of the wheel to be controlled and the wheel pressure of the wheel to be controlled, and controlling the motor according to the pressure gain such that the wheel pressure of the wheel to be controlled follows the target pressure of the wheel to be controlled.

The pressure gain may be set on the basis of the amount of liquid required in the wheel to be controlled with respect to the total amount of liquid required during CBS pressure control.

The method may further include opening the entrance-side valves of the respective wheels and closing the exit-side valves of the respective wheels, when the performance condition of the VDC-associated control or the TCS-associated control is released.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
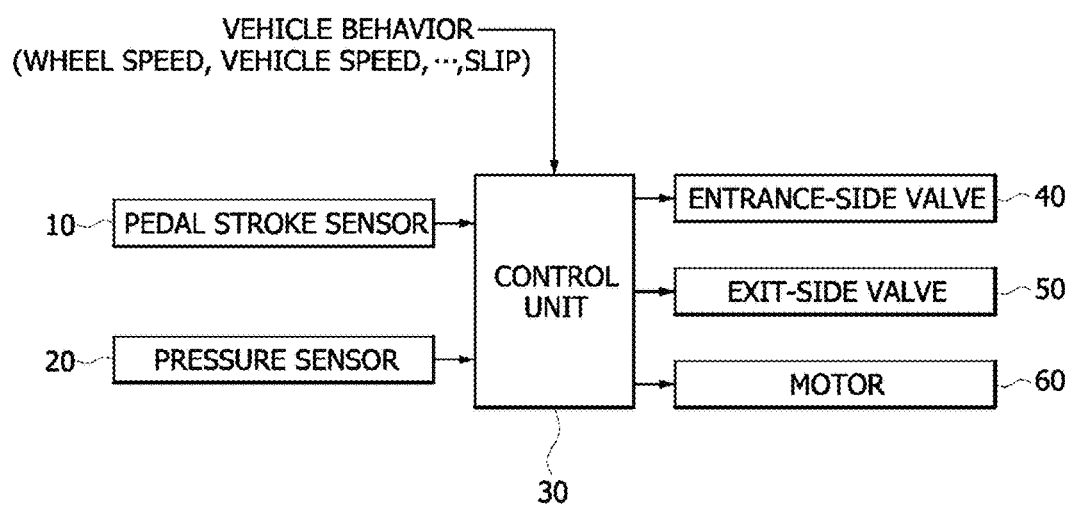
FIG. 1 is a block configuration diagram of an apparatus for controlling a regenerative brake system for a vehicle in accordance with an embodiment of the present invention.
Figure 2:
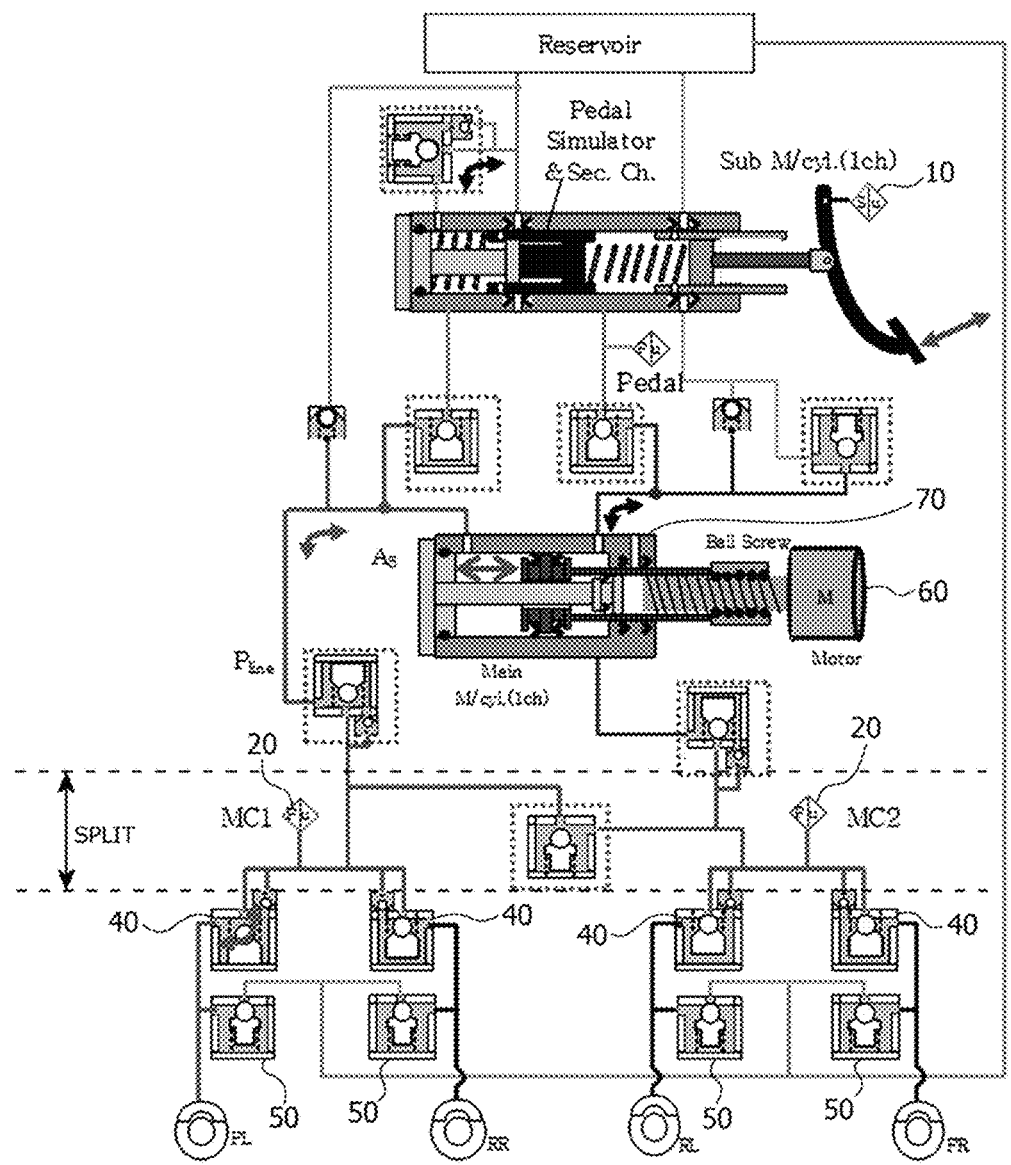
FIG. 2 is a hydraulic pressure circuit diagram of the regenerative brake system for a vehicle in accordance with the embodiment of the present invention.

FIG. 1 is a block configuration diagram of an apparatus for controlling a regenerative brake system for a vehicle in accordance with an embodiment of the present invention. FIG. 2 is a hydraulic pressure circuit diagram of the regenerative brake system for a vehicle in accordance with the embodiment of the present invention.

Referring to FIGS. 1 and 2, the apparatus for controlling a regenerative brake system for a vehicle in accordance with the embodiment of the present invention may include a pedal stroke sensor 10, a pressure sensor 20, a control unit 30, an entrance-side valve 40, an exit-side valve 50, and a motor 60. In the present embodiment, the regenerative brake system may include an ESC (Electronic Stability Control)-integrated brake system including an ESC apparatus which is capable of performing active braking in a CBS (Conventional Brake System).

The pedal stroke sensor 10 may detect a pedal stroke of a brake pedal and input the detected pedal stroke to the control unit 30.

The pressure sensor 20 may be installed on a hydraulic line from an operating valve to the entrance-side valve 40, that is, a split in a hydraulic circuit of the ESC-integrated regenerative brake system of FIG. 2, and detect a split pressure formed at the split. The split pressure may be formed at the same pressure as a wheel pressure during VDC-associated control and TCS-associated control. Thus, the split pressure and the wheel pressure may be understood as the same pressure. This is because the wheel pressure is directly controlled by the motor 60. This will be described below.

As illustrated in FIG. 2, the pressure sensor 20 may be installed at the split, and input the detected split pressure, that is, wheel pressure to the control unit 30.

The entrance-side valve 40 may be installed to correspond one-to-one to each of the wheels FL, FR, RL, and RR and supply brake oil to the corresponding wheel. The exit-side valve 50 may be installed to correspond one-to-one to each of the wheels and discharge the brake oil of the corresponding wheel.

The motor 60 may generate a torque according to a control signal of the control unit 30 and move a piston of the cylinder 70, thereby raising or lowering the wheel pressure of each wheel. In this case, the wheel pressure may be directly controlled by the motor 60 during VDC-associated control and TCS associated control.

The control unit 30 may receive the behavior of the vehicle, such as wheel speed, slip, or vehicle speed, and receive a pedal stroke from the pedal stroke sensor 10. Based on the behavior and the pedal stroke, the control unit 30 may determine whether any one performance condition of ABS-associated control, VDC-associated control, and TCS-associated control is satisfied.

When any one performance condition of the ABS-associated control, the VDC-associated control, and the TCS-associated control is satisfied, the control unit 30 may calculate a target pressure of each wheel.

Then, the control unit 30 may determine whether to perform the ABS-associated control, the VDC-associated control, or the TCS-associated control.

When determining to perform the ABS-associated control, the control unit 30 may apply a current to the motor 60, and generate a split pressure for wheel pressure control. At this time, the control unit 30 may make up for the amount of liquid required while the piston connected to the motor 60 reciprocates to a predetermined displacement in order to continuously raise/lower the wheel pressure. Then, the control unit 30 may open the entrance-side valve 40 of each wheel such that the wheel pressure of the wheel follows the target pressure, and close the exit-side valve 50 of each wheel so as to control the wheel pressure according to the target pressure.

When the behavior of the vehicle is stabilized while the wheel pressure is controlled to the target pressure as described above, the control unit 30 may open the entrance-side valves 40 and the exit-side valves 50 of all the wheels and end the ABS-associated control. Then, the control unit 30 may perform CBS switching control to adjust the displacement of the piston according to the current split pressure, and perform CBS pressure control according to the split pressure sensed through the pressure sensor 20.

When determining to perform the VDC-associated control or the TCS-associated control, the control unit 30 may control the entrance-side valves 40 and the exit-side valves 50 of the respective wheels such that a raised/lowered pressure for a wheel to be controlled (hereinafter, 'target wheel' or 'controlled wheel') is formed. At this time, the control unit 30 may control the motor 60 to form the target pressure at the controlled wheel. That is, the control unit 30 may perform pressure raising/lowering control for the controlled wheel.

The control unit 30 may control the wheel pressure only by controlling the motor 60 in a state where the entrance-side valve 40 of the controlled wheel is opened. That is, the control unit 30 may sense the split pressure (wheel pressure) formed at the split, calculate a pressure gain corresponding to a pressure difference between the wheel pressure and the target pressure of the controlled wheel, and control the motor 60 according to the calculated pressure gain such that the wheel pressure follows the target pressure of the controlled wheel.

As described above, the split pressure and the wheel pressure are equal to each other. This is because, when the entrance-side valve 40 of the controlled wheel is opened and the entrance-side valves 40 of the other non-controlled wheel are closed, a corresponding hydraulic pressure is supplied only to the controlled wheel while the piston is reciprocated by the operation of the motor 60.

Since the split pressure and the wheel pressure are equal to each other, the control unit 30 may recognize the wheel pressure of the controlled wheel through the pressure sensor 20 installed at the split, and control the motor 60 such that the wheel pressure of the controlled wheel follows the target pressure, thereby directly controlling the wheel pressure for the controlled wheel.

Furthermore, the pressure gain may be set for each of the wheels, and previously set according to the pressure difference between the target pressure and the wheel pressure. The pressure gain may be set on the basis of the amount of liquid required in the controlled wheel with respect to the total amount of liquid required during the CBS pressure control.

When the entire pressure gain of the CBS is set to 100%, the amount of liquid required in each of the front wheels FL and FR may be set to 35% of the total amount of liquid required in the CBS, and the amount of liquid required in each of the rear wheels RL and RR may be set to 30% of the total amount of liquid required in the CBS. Thus, the pressure gain of each front wheel may be set to (CBS pressure gain×(35/100)), and the pressure gain of each rear wheel may be set to (CBS pressure gain×(15/100)).

That is, the CBS pressure gain may not be directly applied as the pressure gain of each wheel, but the pressure gain of each wheel may be set to the ratio of the amount of liquid required in the corresponding wheel to the total amount of liquid required in the CBS.

When the performance condition for the VDC-associated control or TCS-associated control is not satisfied while the wheel pressure of the corresponding controlled wheel is controlled, the control unit 30 may open the entrance-side valves 40 of all the wheels and close the exit-side valves 50 of all the wheels. Then, the control unit 30 may perform CBS pressure control according to the split pressure sensed through the pressure sensor 20. In this case, since the exit-side valves 50 of all the wheels are closed and no liquid is discharged to the reservoir tank, the above-described CBS switching control does not need to be performed. As a result, the time required for performing CBS switching control can be reduced.

Hereafter, a method for controlling a regenerative brake system for a vehicle in accordance with an embodiment of the present invention will be described in detail with reference to FIG. 3.

Figure 3:
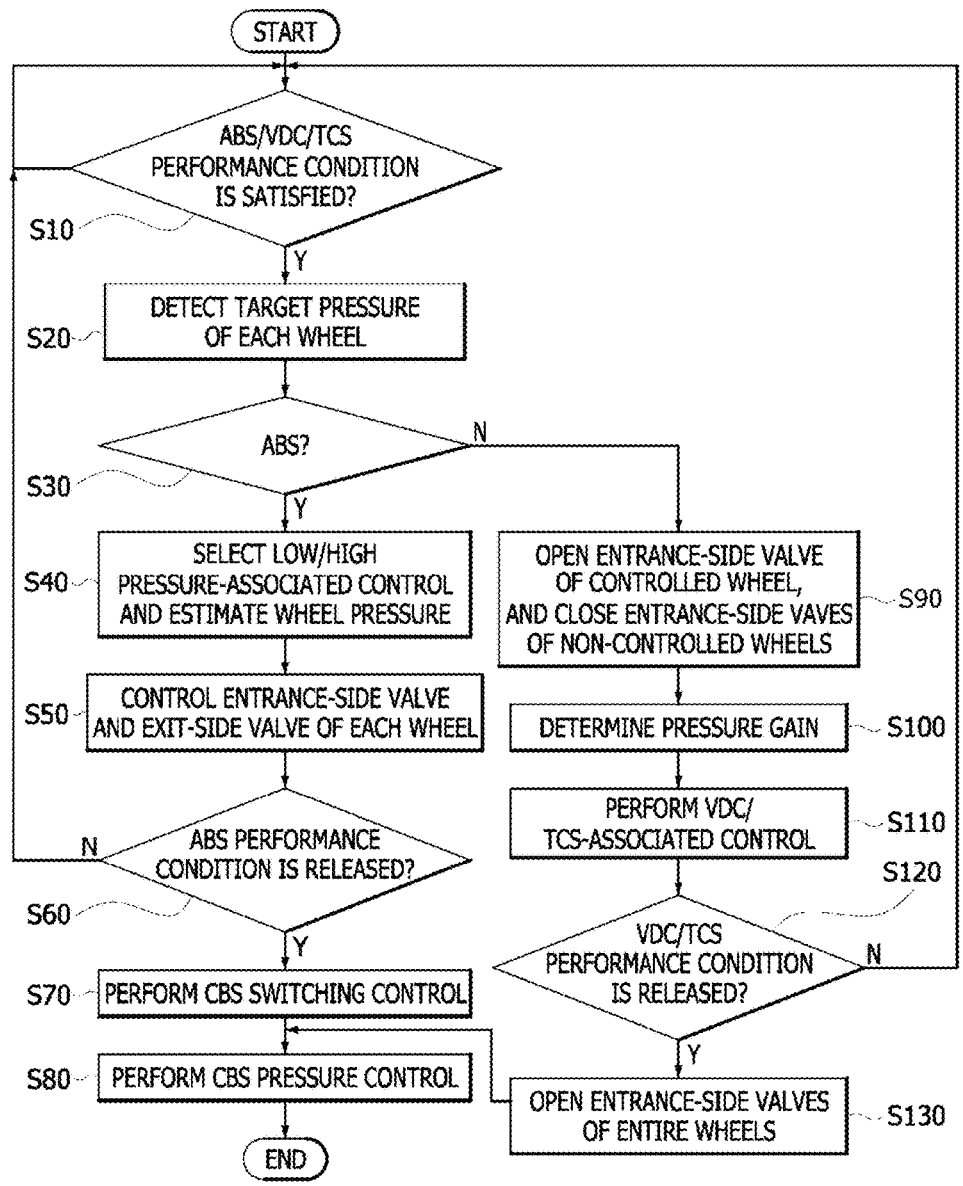
FIG. 3 is a flowchart illustrating a method for controlling a regenerative brake system for a vehicle in accordance with an embodiment of the present invention.

FIG. 3 is a flowchart illustrating a method for controlling a regenerative brake system for a vehicle in accordance with an embodiment of the present invention.

Referring to FIG. 3, the control unit 30 may receive the behavior of the vehicle, such as wheel speed, slip, vehicle speed, or IGN, and determine whether the behavior satisfies any one performance condition of ABS-associated control, VDC-associated control, and TCS-associated control, at step S10.

When it is determined at step S10 that any one performance condition of the ABS-associated control, the VDC-associated control, and the TCS-associated control is satisfied, the control unit 30 may calculate a target pressure of each wheel at step S20.

After calculating the target pressure of each wheel, the control unit 30 may determine whether to perform the ABS-associated control or perform the VDC-associated control or the TCS-associated control, at step S30.

When determining to perform the ABS-associated control at step S30, the control unit 30 may apply a current to the motor 60, and generate a split pressure for wheel pressure control. At this time, the control unit 30 may make up for the amount of liquid required while the piston connected to the motor 60 reciprocates to a predetermined displacement in order to continuously raise/lower the wheel pressure.

Then, the control unit 30 may select any one of high pressure-associated control and low pressure-associated control, and estimate a wheel pressure by calculating the liquid amount using the open time of the entrance-side valve 40 and the exit-side valve 50, at step S40.

For reference, since the liquid formed in the wheel leaks to the reservoir tank during the ABS-associated control, the wheel pressure may be lowered. Then, since the wheel pressure and the split pressure are not equal to each other, the control unit 30 may estimate the wheel pressure by calculating the liquid amount using the open time of the entrance-side valve 40 and the exit-side valve 50.

Then, the control unit 30 may open the entrance-side valve 40 of each wheel such that the estimated wheel pressure follows the target pressure of the wheel, and close the exit-side valve 50 to control the wheel pressure to the target pressure, at step S50.

For example, when the wheel pressure is intended to be raised, the control unit 30 may open the entrance-side valve 40 of the corresponding wheel, and close the exit-side valve 50 of the corresponding wheel. At this time, since the liquid formed at the split is transferred to the wheel of which the pressure is intended to be raised, the pressure of the corresponding wheel may be raised.

Furthermore, when the wheel pressure is intended to be maintained, the control unit 30 may close the entrance-side valve 40 and the exit-side valve 50 of the corresponding wheel. At this time, since the liquid formed in the wheel is maintained, the wheel pressure may be maintained.

Furthermore, when the wheel pressure is intended to be lowered, the control unit 30 may close the entrance-side valve 40 of the corresponding wheel and open the exit-side valve 50 of the corresponding wheel. At this time, since the liquid formed in the wheel is discharged, the wheel pressure may be lowered.

During this process, the control unit 30 may determine whether the behavior of the vehicle is stabilized to release the performance condition of the ABS-associated control, at step S60. When it is determined at step S60 that the performance condition of the ABS-associated control is released, the control unit 30 may open the entrance-side valves 40 and the exit-side valves 50 of all the wheels, and end the ABS-associated control.

During the above-described ABS-associated control, the piston may be continuously reciprocated according to the amount of required liquid. Thus, after the associated control is ended, the position of the piston may not be regular.

Thus, the control unit 30 may perform CBS switching control to adjust the displacement of the piston according to the current split pressure, at step S70. Then, the control unit 30 may perform CBS pressure control according to the split pressure sensed through the pressure sensor 20 at step S80.

When determining to perform the VDC-associated control or the TCS-associated control at step S30, the control unit 30 may open the entrance-side valve 40 of the controlled wheel and close the exit-side valve 50 of the controlled wheel. On the other hand, the control unit 30 may close the entrance-side valves 40 of the other non-controlled wheels excluding the controlled wheel (step S90). Thus, the brake pressure may be supplied only to the corresponding controlled wheel, and not supplied to the other non-controlled wheels.

Then, the control unit 30 may determine a pressure gain at step S100.

In this case, the control unit 30 may calculate the pressure gain according to a pressure difference between the target pressure of the controlled wheel and the split pressure (wheel pressure) sensed through the pressure sensor 20.

When the pressure gain is calculated, the control unit 30 may perform the VDC-associated control or TCS-associated control by controlling the motor 60 according to the pressure gain, at step S110. That is, the control unit 30 may supply a current corresponding to the determined pressure gain to the motor 60, and the motor 60 may be driven according to the corresponding current and reciprocate the piston to directly control the wheel pressure of the controlled wheel.

During this process, the control unit 30 may determine whether the performance condition for the VDC-associated control or TCS-associated control is released according to the behavior of the vehicle, at step S120. When it is determined that the performance condition of the VDC-associated control or TDC-associated control is released, the control unit 30 may open the entrance-side valves 40 of the entire wheels including the controlled wheel at step S130, and perform CBS pressure control according to the split pressure sensed through the pressure sensor 20, at step S80.

Figure 4:
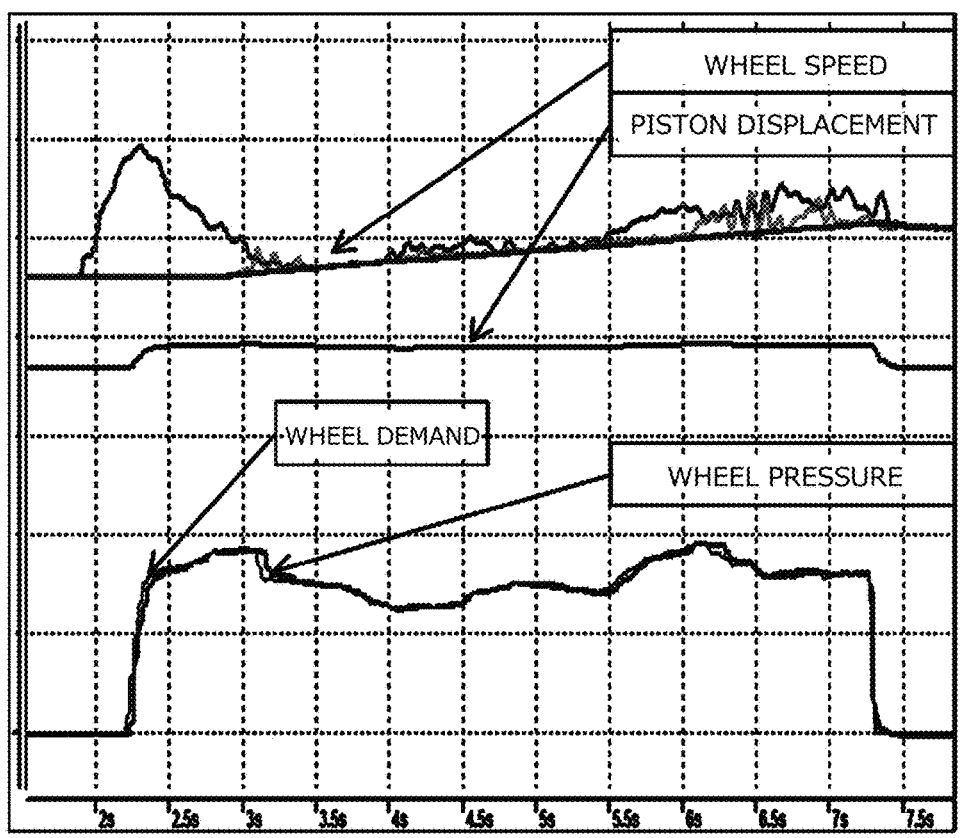
FIG. 4 is a diagram illustrating that a wheel pressure follows a target pressure during TVC control in accordance with the embodiment of the present invention.

FIG. 4 is a diagram illustrating that the wheel pressure follows the target pressure during the TVC control in accordance with the embodiment of the present invention.

FIG. 4 illustrates that the wheel pressure of the controlled wheel substantially follows the target pressure (wheel demand) of the controlled wheel, indicating that the pressure control of the controlled wheel is accurately and precisely performed.

In the present embodiment, the control unit 30 may directly control the wheel pressure based on the split pressure sensed through the pressure sensor 20 during VDC/TCS-associated control, precisely control the wheel pressure even at a low-pressure period, and reduce a delay time required for switching to CBS pressure control after the VDC/TCS-associated control is ended.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for operating a brake system, the method comprising:
    providing a vehicle comprising:
        a hydraulic cylinder,
        a plurality of wheel brakes comprising a first wheel brake and a second wheel brake,
        a plurality of hydraulic pipe lines connecting between the hydraulic cylinder and each of the plurality of wheel brakes for supplying brake power thereto, wherein the plurality of hydraulic pipe lines comprises a split in fluid connection with each of the first and second wheel brakes via at least one valve,
        a pressure sensor configured to detect a hydraulic pressure in the split, and
        a controller configured to control operation of the hydraulic cylinder,
    running the brake system under one from Auto Braking System (ABS) associated control, Traction Control System (TCS) associated control and Vehicle Dynamics Control (VDC) associated control,
    computing a target pressure for each of the plurality of wheel brakes,
    wherein under ABS associated control, the controller controls operation of the hydraulic cylinder for accomplishing the target pressure such that the controller estimates a hydraulic pressure for each of the plurality of wheel brakes and then controls the operation of the hydraulic cylinder to have the estimated hydraulic pressure follow the target pressure,
    whereas under TCS associated control or VDC associated control, the controller controls operation of the hydraulic cylinder using the hydraulic pressure detected by the pressure sensor without estimating a hydraulic pressure for each of the plurality of wheel brakes.

2. A brake system for a vehicle, comprising:
    a hydraulic cylinder;
    a plurality of wheel brakes comprising a first wheel brake and a second wheel brake;
    a plurality of hydraulic pipe lines connecting between the hydraulic cylinder and each of the plurality of wheel brakes for supplying brake power thereto, wherein the plurality of hydraulic pipe lines comprises a split in fluid connection with each of the first and second wheel brakes via at least one valve;
    a pressure sensor configured to detect a hydraulic pressure in the split;
    a controller configured to compute a target pressure for each of the plurality of wheel brakes and to control operation of the hydraulic cylinder using the target pressure,
    wherein under Auto Braking System (ABS) associated control, the controller controls operation of the hydraulic cylinder for accomplishing the target pressure such that the controller estimates a hydraulic pressure for each of the plurality of wheel brakes and then controls operation of the hydraulic cylinder to have the estimated hydraulic pressure follow the target pressure,
    whereas under Traction Control System (TCS) associated control or Vehicle Dynamics Control (VDC) associated control, the controller controls operation of the hydraulic cylinder using the hydraulic pressure detected by the pressure sensor without estimating a hydraulic pressure for each of the plurality of wheel brakes.

3. The brake system of claim 2, for TCS associated control or VDC associated control, the controller opens an entrance-side valve of the first wheel brake and closes an entrance-side valve of the second wheel brake.

4. The brake system of claim 2, wherein the control unit is configured to control an entrance-side valve of the first wheel brake and an exit-side valve of the first wheel brake such that the estimated hydraulic pressure of the first wheel brake follows the target pressure.

5. The apparatus of claim 4, wherein the control unit is configured to estimate the estimated hydraulic pressure by calculating a liquid amount using an open time of the entrance-side valve and the exit-side valve.

* * * * *